May 16, 1950  C. R. MARTIN  2,507,796
HYDRAULIC TURBINE
Original Filed May 8, 1944

Inventor
Charles R. Martin
by George M. Albrecht
Attorney

Patented May 16, 1950

2,507,796

UNITED STATES PATENT OFFICE 2,507,796

HYDRAULIC TURBINE

Charles R. Martin, Wauwatosa, Wis., assignor to Allis-Chalmers Manufacturing Company, Milwaukee, Wis., a corporation of Delaware Original application May 8, 1944, Serial No. 534,677. Divided and this application July 20, 1948, Serial No. 39,611

6 Claims. (Cl. 253—31)

The present invention relates generally to improvements in hydraulic turbines and relates more particularly to hydraulic turbines provided with draft tubes, and the principal object of the invention is to improve the operation of such turbines and draft tubes. This application is a division of my application Ser. No. 534,677, filed May 8, 1944, now abandoned.

It is a known fact that water contains dissolved and entrained gases in varying amounts dependent on the pressure and temperature of the water and surrounding atmosphere as well as the accumulation of dissolved solids therein. Furthermore, water flowing as a stream is generally sufficiently agitated to cause air entrainment, and undissolved solids which may be carried by the water may likewise release gases which are dissolved or entrained by the water. As long as the stream continues to flow in its normal course, the water retains the gaseous content; but when such water is subjected to a change from a relatively high pressure to a substantially lower pressure, the entrained gases are released in proportion to the change in absolute pressure and temperature and the extent of gaseous content. Such action and resultant liberation of gases occurs in a hydraulic turbine wherein the water passes through the turbine runner under pressure and is discharged into the draft tube where a state of vacuum exists.

Since the water discharged from a turbine of the reaction type is subjected to centrifugal force, the natural tendency of the water flow is to produce a vortex in the draft tube, and the liberated gases are thereby collected in the low pressure area below the runner hub. In addition to the vortex formed by the whirling water as it is discharged from the turbine runner, there is no discharge of water in the region immediately below the runner hub in a propeller turbine due to the space occupied by the hub and only a slight discharge from the central runner vane portion of a Francis type turbine. Therefore, since there is a pressure at the inlet side of the turbine runner above atmospheric pressure dependent on the head of the reservoir and there is a partial vacuum below the runner, the gases dissolved and entrained in the water are liberated upon passage through the runner from high to low pressure areas, and the liberated gases collect in the central portion of the draft tube to produce a gas bubble of material area extending a substantial distance into the draft tube. Collection of these released gases continues to occupy an increasing space in the draft tube until the friction of the water in the vortex causes collapse of the gas bubble and carries the gases out of the draft tube, after which a new bubble forms. This collection and collapse of the gas bubble occurs in a recurring cycle at a frequency dependent on the gas content of the water and the rate of water flow through the turbine.

Observation of turbine operation leads to the conclusion that the recurring cycle of bubble collection and collapse causes a corresponding cycle of variations in the output of the turbine due to the fact that the gas bubble collection restricts the available area for water discharge in the draft tube and collapse of the bubble removes this restriction. The bubble collection and collapse cycle is also believed to produce a considerable amount of vibration disturbing the normal operation of a hydraulic turbine. Analysis of liberated gases extracted from the draft tube below and adjacent the runner of a turbine shows that such liberated gases consist of a mixture considerably richer in oxygen than ordinary air, and the presence of such oxygen mixture on the continually wet surface of a turbine runner inevitably aids corrosion or pitting.

It is therefore an object of the present invention to provide means associated with a hydraulic turbine which will stabilize the flow of water through the turbine by equalizing the pressure across the entire area of the turbine draft tube.

Another object of this invention is to provide means for stabilizing and increasing the power output of a hydraulic turbine by making the entire area of the draft tube continuously available for discharge of water from the turbine runner.

Another object of this invention is to reduce the vibration and hammering action which occurs in hydraulic turbines by preventing the formation and collapse of voids in the draft tube which affect the operation of the turbine runner.

Another object of this invention is to provide means for reducing cavitation and pitting of turbine parts and for improving the efficiency of hydraulic turbines by minimizing the effect of liberation of gases from water passing therethrough and preventing accumulation of such gases.

Another object of the present invention is to provide means cooperating with the runner of a hydraulic turbine to equalize the distribution of water through the turbine runner, thereby decreasing the possibility of vaporization and consequent release of oxygen and other gases resulting when the water is permitted to approach spouting velocity.

Another object of this invention is to provide a hydraulic turbine with means for removing the central core of fluent medium from below the turbine runner.

A further object of this invention is to provide an improved runner for a hydraulic turbine which is simple in construction, economical to manufacture, and highly efficient in operation, and which furthermore tends to equalize the velocity of water as it passes therethrough thereby enabling greater turbine output.

Additional objects and advantages of the present invention will be apparent from the following detailed description.

A clear conception of the present improvement and of the mode of constructing and utilizing devices built in accordance with the invention may be had by referring to the drawing accompanying and forming a part of this specification wherein like reference characters designate the same or similar parts in the several views.

Figure 3:
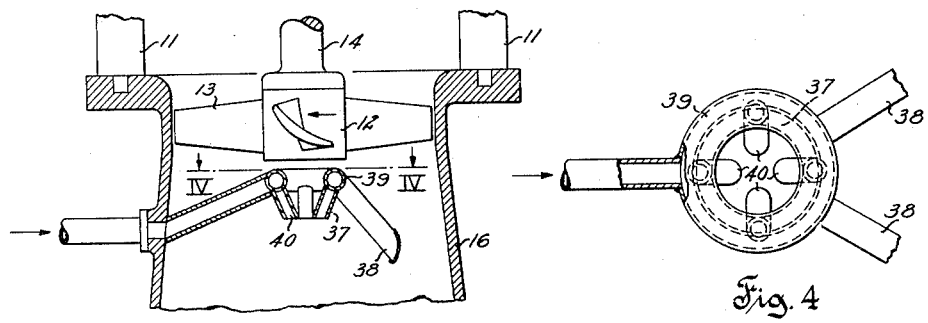
Fig. 3 is a vertical sectional view of a portion of a hydraulic turbine in which means for producing a jet, employing hydraulic pressure, is mounted in the draft tube below and adjacent the runner of a hydraulic turbine to prevent the accumulation of liberated gases in the draft tube.
Figure 4:
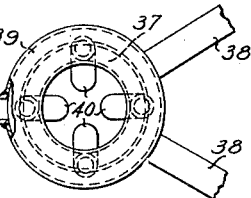
Figure 5:
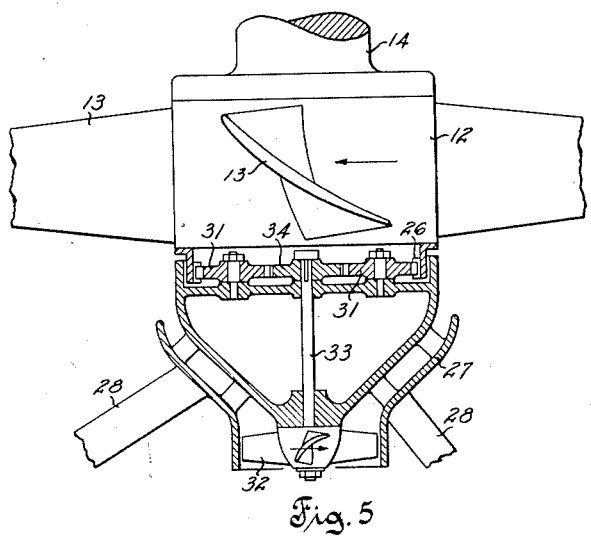

Fig. 4 is a horizontal cross sectional view taken on the line IV—IV of Fig. 3 to further illustrate the structure of the hydraulic jet means shown in Fig. 3; and Fig. 5 is a vertical sectional view of a portion of a hydraulic turbine illustrating means mounted in the draft tube and immediately driven by the runner for causing water flow through the center of the draft tube for forcing liberated gases therefrom.

Referring to the drawing, reference numeral 11 designates the usual movable vanes forming the gate for controlling and directing the flow of water to a hydraulic turbine of the reaction type. A reaction turbine runner herein shown for the sake of simplicity as being of the fixed vane propeller type comprises a hub 12 and vanes 13 suspended from a shaft 14 and this runner receives the flow of water under pressure through the gate vanes 11. The water passing through the runner is discharged into a draft tube 16 which may be constructed in any one of several known ways. The turbine runner is under the pressure of a full head of water above the runner vanes 13 and the bottom of the runner is under a vacuum produced by the draft tube 16. The water discharging from the runner 12, 13 forms a vortex in which a substantially annular body of water is whirled to some extent into contact with the walls of the draft tube 16 at relatively high pressure, approaching and often reaching spouting velocity, and with a portion of the draft tube within the annulus at a very low relative pressure. Such low pressure area in the draft tube is approximately equal in diameter to the runner hub 12 and extends downwardly from beneath the hub a considerable distance into the draft tube 16. As the whirling water reaches spouting velocity, it tends to vaporize and oxygen is thereby released, and the gases dissolved and entrained in the water are likewise liberated upon passage to the low pressure area below the runner. These gases are normally forced to the low pressure area in the draft tube and tend to form a gas bubble on the runner hub as heretofore described.

Figure 1:
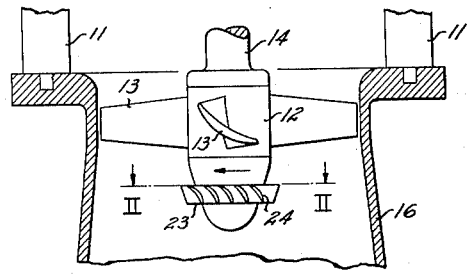
Fig. 1 is a vertical sectional view diagrammatically illustrating a portion of a hydraulic turbine of the reaction type provided with means mounted directly on the turbine runner for producing a flow or jet of water through the center of the draft tube to prevent the accumulation of liberated gases therein.
Figure 2:
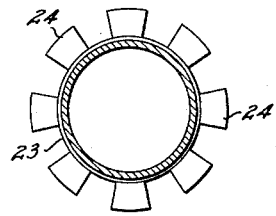
Fig. 2 is a horizontal cross sectional view taken along the line II—II of Fig. 3 to further illustrate the means shown in Fig. 1.

Referring more particularly to Figs. 1 and 2, the desired result may be obtained through the use of the embodiment there illustrated, for forcing released gases to pass out of the draft tube continuously and without allowing the collection of any material quantity of gases therein. Such continuous discharge of gases may be produced by an impeller comprising a ring 23 mounted on the runner hub 12 and provided with vanes 24 of such length, angle and curvature as to produce a desired flow or jet of water into the central portion of the draft tube 16. The length, angle and curvature of the impeller vanes are such as to produce only a sufficient water flow to the center of the draft tube as to secure re-entrainment therewith of the released gases, thereby minimizing the necessary size and weight of the impeller and the amount of power required from the turbine runner for driving the same. Tests have shown that re-entrainment of the gases can be obtained with impellers of various sizes and that such re-entrainment substantially eliminates the power variation and vibration of the turbine believed to be due to the repeated formation and collapse of gas bubbles adjacent the runner. Preventing formation of an extensive gas bubble eliminates the abnormal oxygen concentration which tests have shown amounts to over 22% of the gas mixture and which increases corrosion and pitting of turbine parts. Furthermore, prevention of bubble formation eliminates obstructions in the draft tube 16 thereby providing for more uniform flow through the turbine runner and consequently more equal pressures and flows throughout the draft tube 16 permitting greater discharge of water through the runner and draft tube without reaching the vaporization point. More equal distribution of water and equalization of pressure through the turbine runner and the draft tube result in a highly efficient unit.

Fig. 5 shows a propeller form of impeller for producing the desired re-entrainment and discharge of gases through the draft tube with a reduced requirement for power as compared to the form of impeller as shown in Figs. 1 and 2. In this embodiment, an internal ring gear 26 is mounted on the truncated turbine runner hub 12 and a casing 27 is mounted in the draft tube 16 by means of suitable stays 28. The impeller casing 27 is mounted closely adjacent to the ring gear 26 and provides a support for a plurality of gears 31 engaging the ring gear 26 and driven thereby. The impeller casing 27 is formed to provide a substantially conical passage from adjacent the bottom edge of the runner vanes 13 to a point in the central portion of the draft tube 16 remote from the turbine runner. An impeller 32 shown as being of the propeller type is mounted in the lower portion of the impeller casing passage and a shaft 33 carrying the impeller 32 extends up through the casing and the gear supports and has mounted on the upper end thereof a gear 34 engaged with the gears 31 to drive the impeller 32 as the turbine runner rotates. The ratio of the several gears may be made to produce any desired speed of the impeller 32 and are preferably made to produce such speed as will cause rapid flow of a substantial volume through the casing 27 and down into the central portion of the draft tube 16 thereby equalizing the pressure and flow of water through the turbine runner and draft tube.

Re-entrainment and discharge of the released gases may also be obtained without utilizing power from the turbine itself if a sufficient hydraulic head is present to provide jets of water to the low pressure area below the runner at a relatively high velocity. As shown in Figs. 3 and 4 a substantially conical casing 37 is mounted below and closely adjacent the truncated hub 12. The cone 37 is mounted centrally of the draft tube 16 on suitable stays 38, one of which is preferably hollow and is connected to a header or manifold 39 from the inside and adjacent to the upper edge of the cone 37. Water under suitable pressure is supplied to the header 39 either from a reservoir, penstock, or a pump (not shown) driven by suitable means. The header 39 is connected with a plurality of nozzles 40 extending downwardly to the lower edge of the cone and thus providing a plurality of jets converging on and merging with each other in the central portion of the draft tube. The several jets re-entrain the gases and carry them down to the central portion of the draft tube beyond the point where the entire area of the tube is filled with discharging water which carries the re-entrained gases to the draft tube outlet.

From the foregoing, it will be apparent that the present invention provides means tending to equalize the pressure in the draft tube below the turbine runner and across the entire diameter of such runner. Such means effectively cause the flow of a portion of the water from the annulus of the vortex down the center of the draft tube and furthermore cause continuous movement of the released gases from adjacent the runner. Removal of the gases may be accomplished by the actual withdrawal thereof from the draft tube as such gases are liberated or may be accomplished by reentrainment of the liberated gases in an accelerated flow of water through the center of the draft tube. In all of the embodiments herein illustrated and described, however, more equal distribution of the water through the runner and the draft tube is effected, thereby equalizing the pressure in the draft tube and reducing the possibility that the point of vaporization will be reached. The means disclosed herein for reducing the rate of liberation of the gases and for making the entire area of the draft tube effective for removing the fluent medium from below the runner has proven highly effective and economical, and power stabilization, increased efficiency, reduction of vibration and practical elimination of cavitation and pitting have all been found to result from the means herein disclosed. A further advantage is that greater outputs may be obtained for a given runner diameter and consequently a more economical setting of the turbine is possible.

From a consideration of the principles of the present invention and the illustrated embodiments, it will be apparent to those skilled in the art that various changes and modifications may be made without departing from the scope of the claims.

It is claimed and desired to secure by Letters Patent:

1. In a hydraulic turbine: a turbine runner adapted to be driven by water passing therethrough, said runner comprising vanes extending laterally from a central hub of the type preventing fluid flow therethrough; a draft tube into which water from said turbine runner is directly dischargeable; said runner being such that rotation thereof results in a lower centrifugal pressure in a central zone in said draft tube than in a zone surrounding said central zone, said central zone extending axially from central portions of said vanes directly into said draft tube; and a fluid pump located in said central zone downstream of said runner and comprising an impeller rotatable about the axis of said central zone, said impeller having generally radially extending vanes pitched to project a fluid jet downstream in said draft tube when said impeller is rotated in a predetermined direction; and means for rotating said impeller in said predetermined direction.

2. In a hydraulic turbine: a turbine runner adapted to be driven by water passing therethrough, said runner comprising vanes extending laterally from a central hub; said hub having a surface merging smoothly with an imperforate portion extending downstream thereof to a terminal end; a draft tube into which water from said turbine runner is directly dischargeable; said runner being such that rotation thereof results in a lower centrifugal pressure in a central zone in said draft tube than in a zone surrounding said central zone, said central zone extending from central portions of said vanes directly into said draft tube; and a fluid pump comprising an impeller mounted on and coaxial with said hub portion, said impeller having generally radially extending vanes pitched to cause fluid flow generally axially downstream along the outer surface of said hub portion.

3. In a hydraulic turbine: a turbine runner adapted to be driven by water passing therethrough, said runner comprising vanes extending laterally from a central hub; said hub having an imperforate conoidal portion extending downstream of said runner; a draft tube into which water from said turbine runner is directly dischargeable; said runner being such that rotation thereof results in a lower centrifugal pressure in a central zone in said draft tube than in a zone surrounding said central zone, said central zone extending axially from central portions of said vanes directly into said draft tube; and a fluid pump comprising an impeller mounted on and coaxial with said conoidal portion, said impeller having generally radially extending vanes pitched to cause fluid flow generally axially downstream along the outer surface of said conoidal portion.

4. In a hydraulic turbine: a turbine runner adapted to be driven by water passing therethrough, said runner comprising vanes extending laterally from a central hub; said hub having a surface merging smoothly with an imperforate portion extending downstream thereof to a terminal end; a draft tube into which water from said turbine runner is directly dischargeable; said runner being such that rotation thereof results in a lower centrifugal pressure in a central zone in said draft tube than in a zone surrounding said central zone, said central zone extending from central portions of said vanes directly into said draft tube; flow increasing means for causing flow of water from the inlet side of said runner along the central portions of the runner vanes to the discharge side thereof wholly externally of and along said hub and hub portion into said central zone, said flow increasing means including flow inducing means located in said central zone below said runner and axially fixed relative to said draft tube, said flow inducing means being provided by a fluid jet positively projected wholly externally of said hub axially downstream into the central zone of said draft tube.

5. In a hydraulic turbine: a turbine runner adapted to be driven by water passing therethrough, said runner comprising water driven power producing vanes extending laterally from a central hub of the type preventing flow of fluid therethrough; a draft tube into which water from said turbine runner is directly dischargeable; said runner being such that rotation thereof results in a lower centrifugal pressure in a central zone in said draft tube than in a zone surrounding said central zone, said central zone extending axially from central portions of said vanes directly into said draft tube; and fluid pump means for positively projecting a fluid jet downstream into the central zone of said draft tube, said fluid pump means being disposed downstream of all of said power producing vanes and centrally located in said draft tube.

6. In a hydraulic turbine: a turbine runner adapted to be driven by water passing therethrough, said runner comprising water driven power producing vanes extending laterally from a central hub of the type preventing flow of fluid therethrough; a draft tube into which water from said turbine runner is directly dischargeable; said runner being such that rotation thereof results in a lower centrifugal pressure in a central zone in said draft tube than in a zone surrounding said central zone, said central zone extending from central portions of said vanes directly into said draft tube; flow increasing means for causing flow of water from the inlet side of said runner along the central portions of the runner vanes to the discharge side thereof wholly externally of said hub into said central zone, said flow increasing means including flow inducing means located in said central zone downstream of all of said power producing vanes, said flow inducing means being provided by fluid pump means for positively projecting a fluid jet wholly externally of said hub axially downstream into the central zone of said draft tube.

CHARLES R. MARTIN.

REFERENCES CITED

The following references are of record in the file of this patent:

UNITED STATES PATENTS

| Number | Name | Date |
|---|---|---|
| 1,516,822 | McCormack | Nov. 25, 1924 |
| 1,538,069 | Taylor | May 19, 1925 |
| 1,836,860 | Moody | Dec. 15, 1931 |
| 1,950,777 | Biggs | Mar. 13, 1934 |
| 2,079,258 | Kerr | May 4, 1937 |
| 2,182,974 | Terry | Dec. 12, 1939 |
| 2,300,748 | Rheingans | Nov. 3, 1942 |

FOREIGN PATENTS

| Number | Country | Date |
|---|---|---|
| 100,875 | Austria | Sept. 10, 1925 |
| 478,496 | Great Britain | Jan. 19, 1938 |